(12) United States Patent
Kiest

(10) Patent No.: US 7,523,709 B1
(45) Date of Patent: Apr. 28, 2009

(54) APPARATUS FOR PREVENTION OF FREEZING OF SOIL AND CROP RESIDUE TO KNIFE APPLYING LIQUID ANHYDROUS AMMONIA TO THE GROUND

(76) Inventor: Lauren J. Kiest, 2224 Main St., Quincy, IL (US) 62301-4343

( * ) Notice: Subject to any disclaimer, the term of this patent is extended or adjusted under 35 U.S.C. 154(b) by 0 days.

(21) Appl. No.: 12/098,440

(22) Filed: Apr. 6, 2008

Related U.S. Application Data

(60) Provisional application No. 60/922,198, filed on Apr. 6, 2007.

(51) Int. Cl.
*A01C 23/00* (2006.01)
(52) U.S. Cl. ...................................... 111/119
(58) Field of Classification Search ......... 111/118–120, 111/123–125, 127, 200; 285/5, 420, 422, 285/423, 425, 901, 923
See application file for complete search history.

(56) References Cited

U.S. PATENT DOCUMENTS 6,397,767 B1 * 6/2002 Dietrich, Sr. ................ 111/119

* cited by examiner

*Primary Examiner*—Christopher J. Novosad
(74) *Attorney, Agent, or Firm*—Robert L. Farris; Farris Law, P.C.

(57) ABSTRACT

A plastic discharge tube extends through a swaged cap bore through a metal swaged cap. A conical cap portion of the metal swaged cap is pressed into a retainer ring passage through a metal retainer ring. A swage surface in the retainer ring passage swages the conical portion of the metal swaged cap thereby fixing the position of the plastic discharge tube in the swaged cap bore and locking the swaged cap in the retainer ring passage. The plastic discharge tube is inserted into a steel injection tube fixed to a soil cutting knife. A ring bottom positioning surface contacts and injection tube upper end of the injection tube. A delivery hose is telescopically received on a plastic discharge tube retainer assembly and the steel injection tube. Hose clamps clamp the delivery hose to the retainer assembly and the injection tube.

11 Claims, 3 Drawing Sheets

APPARATUS FOR PREVENTION OF FREEZING OF SOIL AND CROP RESIDUE TO KNIFE APPLYING LIQUID ANHYDROUS AMMONIA TO THE GROUND

CROSS REFERENCE TO RELATED APPLICATIONS

This application claims the benefit of the filing date of U.S. Provisional Application No. 60/922,198 titled METHOD AND APPARATUS FOR PREVENTION OF FREEZING OF SOIL AND CROP RESIDUE TO KNIFE APPLYING LIQUID ANHYDROUS AMMONIA TO THE GROUND, filed Apr. 6, 2007.

TECHNICAL FIELD

The present invention relates to a new apparatus and method for prevention of freezing of soil and crop residue to a knife which is being used to inject anhydrous ammonia into the soil. More particularly, the invention relates to a process which reduces heat transfer from the cold stream of gaseous and liquid ammonia as it passes through the injection tube attached to the knife. Such heat transfer can cool the knife sufficiently to allow soil and crop residue to freeze to the knife. This invention provides a thermal barrier of gas and low conductivity plastic to reduce the rate of heat transfer between the cold ammonia stream and the body of the knife.

BACKGROUND OF THE INVENTION

Injection of anhydrous ammonia into the soil is a commonly used method of supplying nitrogen fertilizer to grain and other crops using an applicator vehicle pulled by a tractor. An ammonia storage tank is pulled behind the applicator. A hose connects the storage tank to the distribution system on the applicator. The distribution system splits the ammonia into separate lines which feed several knives. These knives are lowered into the soil several inches and ammonia is injected into the ground at the bottom of the knives as the knives are pulled through the soil.

Anhydrous ammonia is also used as a commercial refrigerant. Pressurized liquid ammonia assumes a temperature of about −28° F. when it is depressurized to atmospheric pressure. As it loses pressure, part of the ammonia liquid evaporates, the heat of evaporation cooling the resulting vapor and liquid. The ratio of vapor to liquid is determined solely by the saturation temperature at the original pressurization and the ammonia's current pressure. The fact that anhydrous ammonia is an excellent refrigerant causes a problem when it is being applied as fertilizer in a field. By the time the ammonia reaches the knife or other injection device it has depressurized to near atmospheric pressure and is very cold. The injection tube is attached to the knife which opens the soil. Heat transfer between the tube and the body of the knife is such that, under some conditions, soil and crop residue will freeze to the knife.

Typically, the anhydrous ammonia is divided among the multitude of knives or other injection devices at one or more manifolds. Plastic tubing is used to connect the manifold outlets to the steel tubes attached to the knives. These tubes are typically ⅜ to ½ inch outside diameter with a wall thickness of over 1/16 inch. Most commonly, the plastic tubing is made from EVA copolymer, non-reinforced. The tubing is held in place by hose clamps.

There are at least two systems in commercial use which transport anhydrous ammonia by small diameter, high pressure plastic tubing from manifolds to the injection devices at the soil. One is manufactured by Exactrix Global Systems of Spokane, Wash. The other is manufactured by a NH3.Company of Quincy, Ill. Typically, the high pressure plastic tubes extend through metal injection tubes, terminate at the exits of the injection tubes and are restrained so that they do not move with respect to the injection tubes. These systems require the use of long sections of the small plastic tube to connect from the manifolds through the injection tubes touching the soil. Discharge orifices are provided on the discharge end of each small plastic tube to keep anhydrous ammonia at an elevated pressure and warm. An advantage of this approach is that the small plastic tubing has a small vapor gap between it and the larger steel injection tube which goes to the soil. Additionally, the plastic tube has poor thermal conductivity. The combination of air gap and poor thermal conductivity reduces heat flow from the body of the knife to the anhydrous ammonia stream in the injection tube. This prevents or minimizes the freezing of soil and crop residue to the knife. High pressure systems may leak expensive ammonia and can result in injury to individuals using the high pressure systems.

More commonly, anhydrous ammonia systems use ⅜" I.D. or ½" I.D. clear EVA copolymer non reinforced plastic tubing to connect to the injection tubes, the inside diameter of the tubing being determined by the outside diameter of the injection tube. The wall thickness of the EVA copolymer tubing is generally 1/16 inch or greater. Pressures carried by this tubing are low, generally less than 60 psig. This method causes the steel injection tubes to become very cold since the ammonia passing through them is near atmospheric pressure and approaching the temperature of ammonia at atmospheric pressure, about −28° F. Under some conditions when these very cold tubes transmit heat from the bodies of the knives, soil and crop residue freeze to the knives.

SUMMARY OF THE INVENTION

The method and apparatus of the present invention provides a method of reducing heat transfer between the body of an injection knife and its related steel injection tube. A short length of small diameter plastic tube is inserted so that it goes down the length of the injection tube. This plastic tube is sufficiently small to allow a small air gap between it and the steel injection tube. The combination of the air gap and the poor thermal conductivity of the plastic minimizes heat transfer between the anhydrous ammonia stream and the knife body. This reduced heat transfer prevents or minimizes the freezing of soil and crop residue to the knife.

To prevent movement of the plastic tube in the steel injection tube, the plastic tube is fixed to the steel tube by a retaining device. The retaining device is constructed with the same outside diameter as the injection tube. The plastic tube is held inside the steel injection tube by its retaining device at the entry to the steel injection tube. The plastic tube typically has an outside diameter of ¼ inch to ⅜ inch and a wall thickness of approximately 1/32 inch. EVA copolymer flexible tubing from the manifold connects over the retaining device for the plastic tube and over the end of the steel injection tube. Two hose clamps are placed over the EVA tubing, one holding the EVA tubing to the end of the steel injection tube and one clamping the retaining device next to the steel injection tube. Without the retaining device the plastic tube could either fall out of the steel tube and on to the ground or migrate back up inside the EVA tube. In either case the insulating benefit of the plastic tube would be lost.

The plastic tube is long enough to reach the exit end of the steel injection tube. Anhydrous ammonia passing through the plastic tube experiences a significant pressure drop, reaching atmospheric pressure as it exits the injection tube. Its pressure and temperature continuously lower as the anhydrous moves through the short plastic tube until it reaches about −28° F. as it exits the injection tube. This very cold stream takes minimal heat from the steel injection tube and knife because it has no direct contact with the steel injection tube.

BRIEF DESCRIPTION OF THE DRAWINGS

The presently preferred embodiment of the invention is disclosed in the following description and in the accompanying drawings, wherein.

DETAILED DESCRIPTION OF THE PREFERRED EMBODIMENTS

Figure 1:
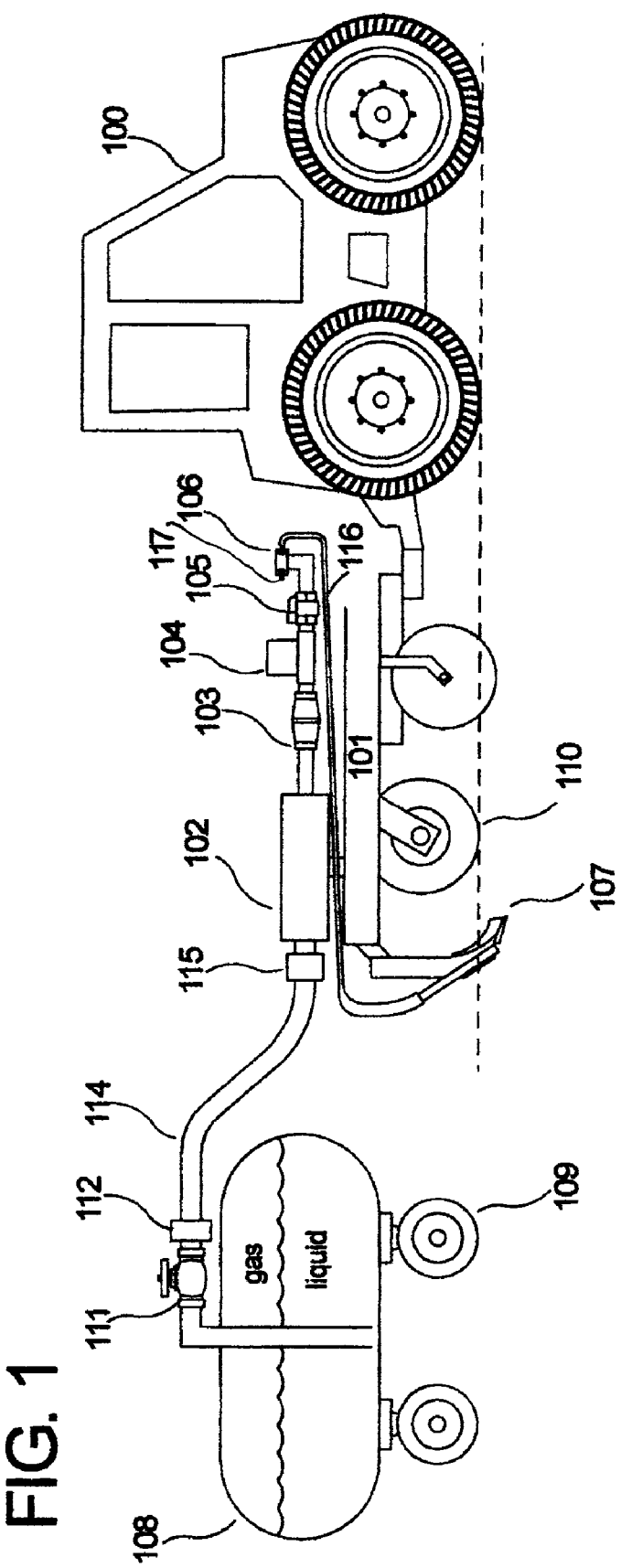
FIG. 1 is a side elevation of the apparatus of the present invention being pulled behind a tow vehicle.

Referring first to FIG. 1, the anhydrous ammonia fertilizer applicator 10 of the present invention is shown being pulled behind a tow vehicle 100 which could be a tractor, truck, or the like. The apparatus includes a toolbar applicator frame 101 which supports a heat exchanger 102, a flow sensor 103, a flow control valve 104, a hydraulically operated shut off valve 105, a distribution manifold 106 with flow control orifices and a plurality of soil cutting knives 107. A storage tank 108 is supported on a plurality of wheels 109 and towed behind the toolbar applicator frame 101. The toolbar applicator frame 101 itself is supported on a plurality of wheels 110 and has a tongue that is pivotally connected to a hitch on the rear of the tow vehicle 100. In the preferred embodiment, the toolbar applicator frame 101 is a Progressive series 1300 NH3 Toolbar, manufactured by Progressive Farm Products, Inc. of Hudson, Ill. It is configured by Progressive for "strip till" ammonia application. Multiple knives 107 are suspended from the frame, with there being typically 8, 12, or 16 of the knives 107 attached to a toolbar applicator frame 101, which is adapted to raise or lower the knives 107 into the soil. Each knife 107 includes at least one steel injector tube 201 through which the ammonia can be emitted into the soil when the knife 107 is lowered into the soil.

The storage tank 108 is a pressurized tank that is commercially available and retains a predetermined quantity of fertilizer which may be, by way of illustration, anhydrous ammonia. The storage tank 108 is on a trailer that also has a tongue that is pivotally connected to a hitch on the toolbar applicator frame 101.

Figure 2:
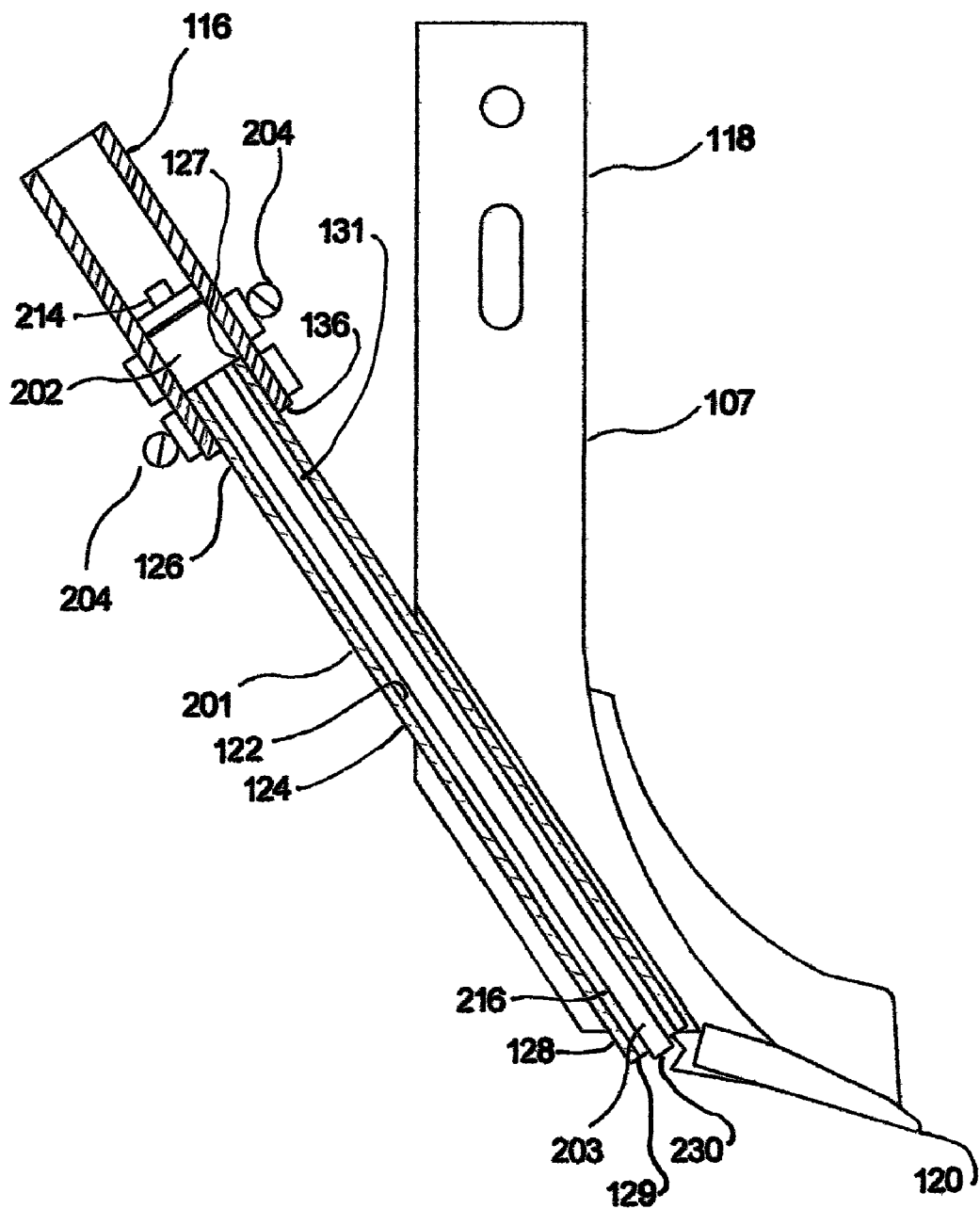
FIG. 2 is a sectional view of the present invention inside a steel injection tube.
Figure 3:
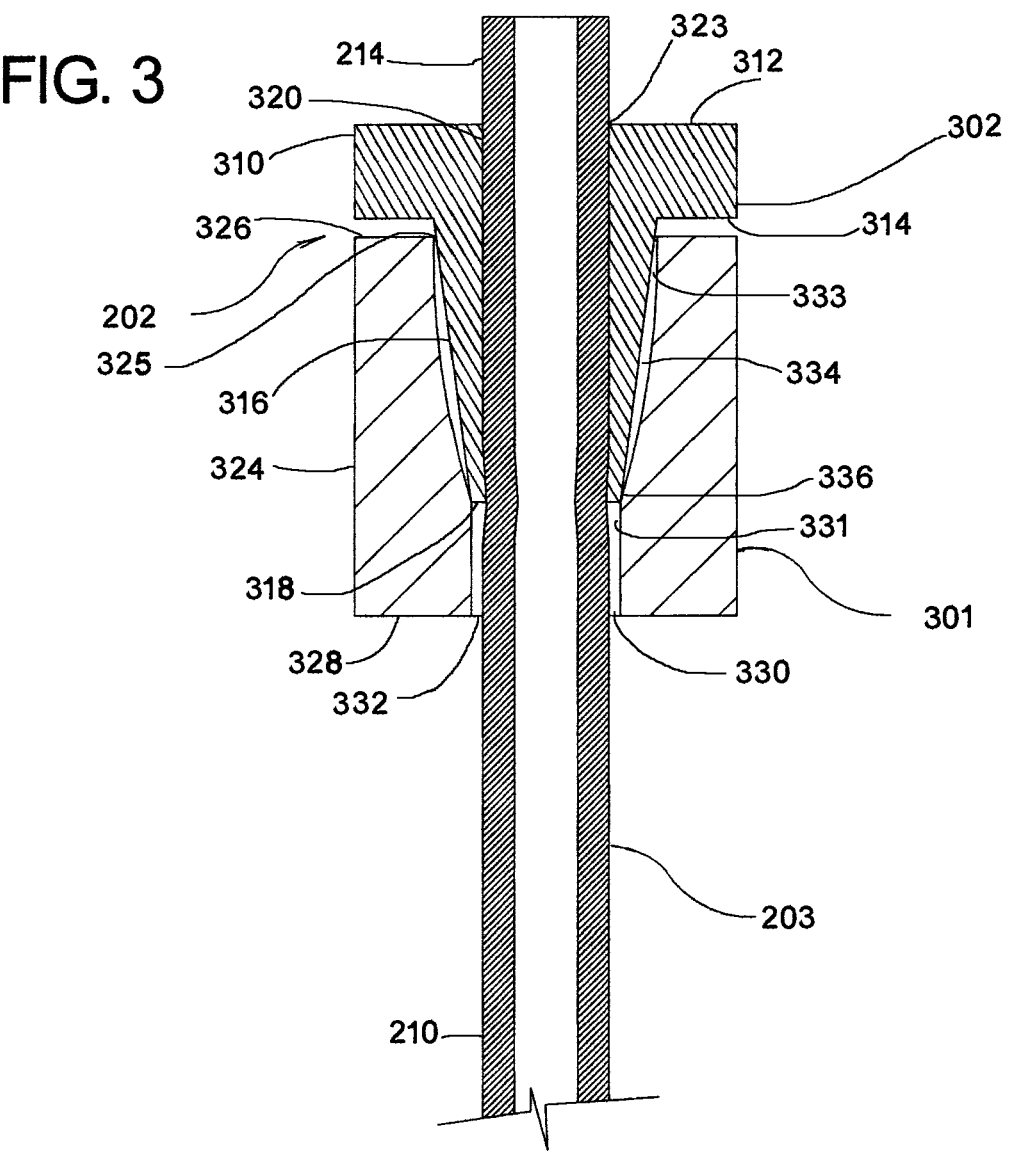
FIG. 3 is an enlarged sectional view of the present invention showing the plastic tube inside its retaining assembly with parts broken away.

FIGS. 1-3 depict the apparatus of the present invention. As shown clearly in FIG. 1, a main delivery or exit hose 114 passes from the supply tank 108 after an appropriate manually-operable shutoff valve 111 and a quick connect coupling 112 to a breakaway coupling 115 and then to a heat exchanger 102 on the toolbar applicator frame 101. The main delivery hose 114 would be, by way of example, a 1.25" internal diameter ("I.D.") reinforced neoprene-lined hose. A flow sensor 103 is connected to a console/controller in the cab of the tow vehicle 100 so that the operator of the tow vehicle 100 can monitor and control the flow of ammonia through a servo valve 104. The console/controller regulates the servo valve 104. Following the servo valve 104 the liquid ammonia flows to one or more hydraulically operated shut off valves 105. After each shut off valve 105 is a distribution manifold 106 where liquid ammonia is split into streams for multiple injection knives 107. At the manifold exit to each knife is an orifice in a manifold exit tube 117 which creates a back pressure on the flow control system, maintaining the ammonia at a pressure above its saturation pressure. The orifices provide equal flow to each knife line. Flexible hoses 116 connect these lines from the manifold 106 to the knives 107.

Referring to FIG. 2, the apparatus of the present invention is shown as a sectional view of the steel injection tube 201 attached to the knife 107. A flexible plastic hose 116 connects over the inlet end of the steel injection tube 201 and over the retainer assembly device 202 for the plastic tube 203. A hose clamp 204 holds the plastic flexible hose 116 over the inlet end of the steel injection tube 201. Another hose clamp 204 clamps the retaining device 202 next to the end of the steel injection tube 201.

Referring to FIG. 3, the apparatus of the present invention is shown as a sectional view of the plastic tube 203 and its retaining device 202. The retaining device consists of two parts, a retaining ring 301 and swaged cap 302. The plastic tube 203 is rigidly held by the end of the swaged cap 302 which has its small diameter protrusion pinched by the progressively smaller inside diameter of the retaining ring as the swaged cap 302 is forced into the retaining ring 301. This procedure is similar to the method of holding steel tubing in compression ferrule hydraulic fittings.

The plastic tube 203 may be made from plastics including, but not limited to, Teflon®, nylon and polyethylene.

The anhydrous ammonia fertilizer applicator 10 includes a soil cutting knife 107. The soil cutting knife 107 includes a cutting knife upper end 118 that is connectable to a tool bar 101 and a cutting knife lower end 120 that penetrates soil. A metal injection tube 201 having an injection tube inside diameter 122 an injection tube outside diameter 124, an injection tube upper end 126 with an injection tube top end surface 127 and an injection tube lower end 128 with an injection tube bottom end surface 129. The metal injection tube 201 is attached to the soil cutting knife 107 with the injection tube lower end 128 positioned behind and above the cutting knife lower end 120.

A plastic discharge tube 203 has a discharge tube inside diameter 212, a plastic tube outside diameter 210, a plastic tube upper end 214 and a plastic tube lower end 216 with a plastic tube bottom surface 230. The plastic tube outside diameter 210 is smaller than the injection tube inside diameter 122 thereby forming an air chamber 131 inside the metal injection tube 201 and outside the plastic discharge tube 203.

A plastic tube retainer assembly 202 includes a metal swaged cap 302 with a cap cylindrical upper portion 310 and a cap cylindrical portion bottom surface 314. A conical cap lower portion 316 is integral with the cap cylindrical upper portion 310 and includes a conical cap bottom end 318 with a minimum cone diameter 336 of the conical cap lower portion 316. A swaged cap bore 320 passing through the cap cylindrical upper portion and through the conical cap lower portion 316. The swaged cap bore 320 is coaxial with the cap cylindrical upper portion 310 and the conical cap lower portion 316. A metal retainer ring 301 has a cylindrical retainer ring outer surface 324, a retainer ring bottom positioning surface 328, and a retainer ring passage 330 that is coaxial with the cylindrical retainer ring outer surface 324. The retainer ring passage 330 includes a lower passage cylindrical portion 331 with a cylindrical bore diameter 332 that exceeds the swaged cap bore diameter 332, a central passage portion swage surface 334 and an upper passage portion 333. The upper passage portion 333 receives the conical cap lower portion 316 of the metal swaged cap 302.

The plastic discharge tube 203 extends through the swaged cap bore 320. The conical cap lower portion 316 is received in the retainer ring passage 330. The central passage portion swage surface 334 deforms the swaged cap bore 320 and locks the plastic discharge tube 203 in a fixed position in the swaged cap bore 320.

The retainer ring bottom positioning surface 328 sits on the injection tube top end surface 127. The plastic tube lower end 216 extends down into the metal injection tube 201 and the plastic tube bottom surface 230 is adjacent to the injection tube bottom end surface 129. The plastic discharge tube 203 provides maximum protection from heat transfer to the anhydrous ammonia fertilizer when the plastic tube bottom surface 230 is slightly below the metal injection tube bottom end surface 129. However, the possibility of plastic discharge tube 203 damage is reduced if the plastic tube bottom surface 230 is slightly above or at the same height as the metal injection tube bottom end surface 129.

A flexible plastic fertilizer delivery hose 116 has a hose discharge end 136 that is telescopically received on the cylinder retainer ring outer surface 324 and telescopically received on the injection tube upper end 126. A top hose clamp 204 clamps the hose discharge end to the cylindrical retainer ring outer surface 324 and a bottom hose clamp 204 clamps the hose discharge end 136 to the injection tube upper end 126. The top hose clamp 204 forms a seal between the flexible plastic fertilizer delivery hose 116 and the cylindrical retainer ring outer surface 324. The bottom hose clamp 204 forms a seal between the hose discharge end 136 and the steel injection tube upper end 126. The bottom hose clamp 204 also holds the retainer ring bottom positioning surface 328 in engagement with the steel injection tube top end surface 127.

The swaged cap 302 and the retainer ring 301 may be made from stainless steel. A press forces the conical cap lower portion into the retainer ring passage 330 to permanently connect the swaged cap 302 to the retainer ring 301. The swaged cap bore 320 is reduced in diameter by the swage surface 334 during the press operation to hold the plastic discharge tube 203 in fixed position in the swaged cap bore 320.

The cylindrical upper portion 310 of the swaged cap 302 has the same diameter as the cylindrical retainer ring outer surface 324 and can therefore be employed as a clamping and sealing surface if desired.

I claim:

1. An anhydrous ammonia fertilizer applicator comprising:
    a soil cutting knife with a cutting knife upper end connectable to a tool bar and a cutting knife lower end that penetrates soil, a metal injection tube having an injection tube inside diameter, an injection tube outside diameter, an injection tube upper end with an injection tube top end surface, an injection tube lower end, with an injection tube bottom end surface attached to the soil cutting knife with the injection tube lower end positioned behind and above the cutting knife lower end;
    a plastic discharge tube having a discharge tube inside diameter, a plastic tube outside diameter, a plastic tube upper end and a plastic tube lower end with a plastic tube bottom surface and wherein the plastic tube outside diameter is smaller than the injection tube inside diameter thereby forming an air chamber inside the metal injection tube and outside the plastic discharge tube;
    a plastic tube retainer assembly including a metal swaged cap with a cap cylindrical upper portion, a cap cylindrical portion bottom surface, a conical cap lower portion integral with the cap cylindrical upper portion with a conical cap bottom end having a minimum diameter, a swaged cap bore passing through the cap cylindrical upper portion and through the conical cap lower portion and wherein the swaged cap bore is coaxial with the cap cylindrical upper portion and the conical cap lower portion, a metal retainer ring with a cylindrical retainer ring outer surface, a retainer ring bottom positioning surface, a retainer ring passage coaxial with the cylindrical retainer ring outer surface and wherein the retainer ring passage includes a lower passage cylindrical portion with a cylindrical bore diameter that exceeds a swaged cap bore diameter, a central passage portion swage surface, and an upper passage portion that receives the conical cap lower portion of the metal swaged cap;
    wherein the plastic discharge tube extends through the swaged cap bore, the conical cap lower portion is received in the retainer ring passage, the central passage portion swage surface deforms the swaged cap bore and locks the plastic discharge tube in a fixed position in the swaged cap bore; and
    wherein the retainer ring bottom positioning surface sits on the injection tube top end surface, the plastic tube lower end extends down into the metal injection tube and the plastic tube bottom surface is adjacent to the injection tube bottom end surface;
    a flexible plastic fertilizer delivery hose with a hose discharge end telescopically received on the cylindrical retainer ring outer surface and telescopically received on the injection tube upper end, a top hose clamp clamping the hose discharge end to the cylindrical retainer ring outer surface and a bottom hose clamp clamping the hose discharge end to the injection tube upper end.

2. An anhydrous ammonia fertilizer applicator, as set forth in claim 1, wherein the retainer ring passage has a passage diameter adjacent to a retainer ring upper surface that insures engagement between the conical cap lower portion and the retainer ring passage when the metal swaged cap is pressed into the retainer ring passage.

3. An anhydrous ammonia fertilizer applicator, as set forth in claim 1, the metal injection tube is steel.

4. An anhydrous ammonia fertilizer applicator, as set forth in claim 1, wherein the plastic discharge tube is Teflon®.

5. An anhydrous ammonia fertilizer applicator, as set forth in claim 1, wherein the plastic discharge tube is nylon.

6. An anhydrous ammonia fertilizer applicator, as set forth in claim 1, wherein the plastic discharge tube is polyethylene.

7. An anhydrous ammonia fertilizer applicator, as set forth in claim 1, wherein the metal retainer ring is stainless steel.

8. An anhydrous ammonia fertilizer applicator, as set forth in claim 7, wherein the metal swaged cap is stainless steel.

9. An anhydrous ammonia fertilizer applicator, as set forth in claim 1, including a tool bar connected to and towed by a tractor and a plurality of said soil cutting knives attached to the tool bar; and
    an ammonia distribution manifold mounted on the tool bar and having a plurality of ammonia supply outlets each of which is connected to one of the flexible plastic fertilizer delivery hoses.

10. An anhydrous ammonia fertilizer applicator, as set forth in claim 1, wherein the metal swaged cap is pressed into the retainer ring passage through the metal retainer ring to lock the metal retainer ring to the metal swaged cap.

11. An anhydrous ammonia fertilizer applicator comprising:

a soil cutting knife with a cutting knife upper end connectable to a tool bar and a cutting knife lower end that penetrates soil, a steel injection tube having an injection tube inside diameter, an injection tube outside diameter, an injection tube upper end with an injection tube top end surface, an injection tube lower end, with an injection tube bottom end surface attached to the soil cutting knife with the injection tube lower end positioned behind and above the cutting knife lower end;

a plastic discharge tube made from Teflon® having a discharge tube inside diameter, a plastic discharge tube outside diameter, a plastic discharge tube upper end and a plastic discharge tube lower end with a plastic discharge tube bottom surface and wherein the plastic discharge tube outside diameter is smaller than the injection tube inside diameter thereby forming an air chamber inside the steel injection tube and outside the plastic discharge tube;

a plastic discharge tube retainer assembly including a stainless steel swaged cap with a cap cylindrical upper portion, a cap cylindrical portion bottom surface, a conical cap lower portion integral with the cap cylindrical upper portion with a conical cap bottom end having a minimum diameter, a swaged cap bore passing through the cap cylindrical upper portion and through the conical cap lower portion and wherein the swaged cap bore is coaxial with the cap cylindrical upper portion and the conical cap lower portion, a stainless steel retainer ring with a cylindrical retainer ring outer surface, a retainer ring bottom positioning surface, a retainer ring passage coaxial with the cylindrical retainer ring outer surface and wherein the retainer ring passage includes a lower passage cylindrical portion with a cylindrical bore diameter that exceeds a swaged cap bore diameter, a central passage portion swage surface, and an upper passage portion that receives the conical cap lower portion of the stainless steel swaged cap;

wherein the plastic discharge tube extends through the swaged cap bore, the conical cap lower portion is received in the retainer ring passage, the central passage portion swage surface deforms the swaged cap bore and locks the plastic discharge tube in a fixed position in the swaged cap bore; and wherein the retainer ring bottom positioning surface sits on the injection tube top end surface, the plastic tube lower end extends down into the steel injection tube and the plastic tube bottom surface is adjacent to the injection tube bottom end surface;

a flexible plastic fertilizer delivery hose with a hose discharge end telescopically received on the cylindrical retainer ring outer surface and telescopically received on the injection tube upper end, a top hose clamp clamping the hose discharge end to the cylindrical retainer ring outer surface and a bottom hose clamp clamping the hose discharge end to the injection tube upper end.

* * * * *